United States Patent [19]

Perkins

[11] Patent Number: 4,458,236
[45] Date of Patent: Jul. 3, 1984

[54] COMMUNICATIONS SIGNAL COUPLING AROUND WYE/DELTA POWER TRANSFORMATION

[75] Inventor: William C. Perkins, Sachse, Tex.

[73] Assignee: Rockwell International Corporation, El Segundo, Calif.

[21] Appl. No.: 367,848

[22] Filed: Apr. 13, 1982

[51] Int. Cl.³ .............................................. H04B 3/54
[52] U.S. Cl. .................................. 340/310 R; 307/3; 179/2.51
[58] Field of Search ........ 340/310 R, 310 A, 310 CP; 323/361; 307/3, 140; 179/2.51, 170 H

[56] References Cited

U.S. PATENT DOCUMENTS 4,188,619  2/1980  Perkins ............................ 340/310 R

FOREIGN PATENT DOCUMENTS 621758  10/1929  France ............................ 340/310 R
965775   9/1950  France ............................ 340/310 R
378435   8/1932  United Kingdom ............ 340/310 R Primary Examiner—James J. Groody
Assistant Examiner—Michael F. Heim
Attorney, Agent, or Firm—V. Lawrence Sewell; Howard R. Greenberg; H. Fredrick Hamann

[57] ABSTRACT

A circuit is disclosed for coupling a power line communications signal between two three-phase power lines, with the signal being transmitted in a balanced phase-to-neutral mode on the first line and in a phase-to-phase mode on the second line. The circuit includes two coupling transformers, one open-wye to open-delta, and the other open-delta to open-delta. The primary of one of the transformers is connected to one of the three-phase lines, while the primary of the other transformer is connected to the other three-phase lines. The secondaries of the transformers are connected together at one terminal of each and interconnected by a capacitor at the other terminal of each. Signal and power voltage ratios between the two power lines are matched, and the capacitor is selected to provide series resonance in the secondary loop of the coupling circuit at the power line communications signal carrier frequency.

10 Claims, 2 Drawing Figures

COMMUNICATIONS SIGNAL COUPLING AROUND WYE/DELTA POWER TRANSFORMATION

BACKGROUND OF THE INVENTION

This invention relates to coupling a power line communications signal in both directions between two three-phase power lines, wherein the signaling mode is phase-to-neutral on one of the power lines and phase-to-phase on the other.

Power line communications signals are transmitted on three-phase lines alternatively in a phase-to-neutral mode and in a phase-to-phase mode. It is sometimes important to couple between power lines that are using these opposite modes. It is believed that none of the prior art coupling circuits can provide an optimized bilateral coupling between a wye feeder with a balanced phase-to-neutral signal and a delta feeder with opposing phase-to-phase signals. The present invention provides such a coupling circuit. It is a circuit using only passive components and is particularly applicable to communication signals having a carrier frequency in the 3-10 KHz range.

SUMMARY OF THE INVENTION

The present invention provides a circuit for coupling a power line communication signal between two three-phase power lines, with the communication signal being transmitted in a balanced phase-to-neutral mode on the first line and in an opposing phase-to-phase mode on the second line. The circuit includes two coupling transformers, a first transformer having an open wye primary and an open delta secondary, and the second transformer having an open delta primary and secondary. The primary of one of the transformers is connected to the first of the three-phase lines, and the primary of the other transformer is connected to the second of the three-phase lines. The windings of the secondary of each transformer provide a common terminal and two available terminals. One of the available terminals in one of the secondaries is directly connected to one of the available terminals in the other secondary, while the remaining available secondary terminals are interconnected with a capacitor.

The transformer configuration provides the required mode change from phase-to-neutral to phase-to-phase. The combination of the transformer action and the blocking action of the capacitor isolate the two power lines from each other at the fundamental power frequency and lower harmonics thereof.

Because the capacitor is in the low-voltage secondary circuit of the transformers, it need not be rated at the primary feeder voltage, nor are specially rated transformers required.

In a preferred embodiment, the voltage ratio of the communication signal on the first power lines to that on the second power lines is approximately the same as the ratio of the power voltages on those lines. This provides maximum transparency to the communication signal being transmitted in both directions through the coupling circuit.

Further in a preferred embodiment, the capacitor is selected so that the series circuit including the capacitor, the self inductance of the transformers and, possibly the series inductance of interconnecting lines, is resonant at the carrier frequency of the communication signal. This serves to reduce the signal coupling loss and maximizes the communication signal level in both directions of transmission.

DESCRIPTION OF PREFERRED EMBODIMENTS

Figure 1:
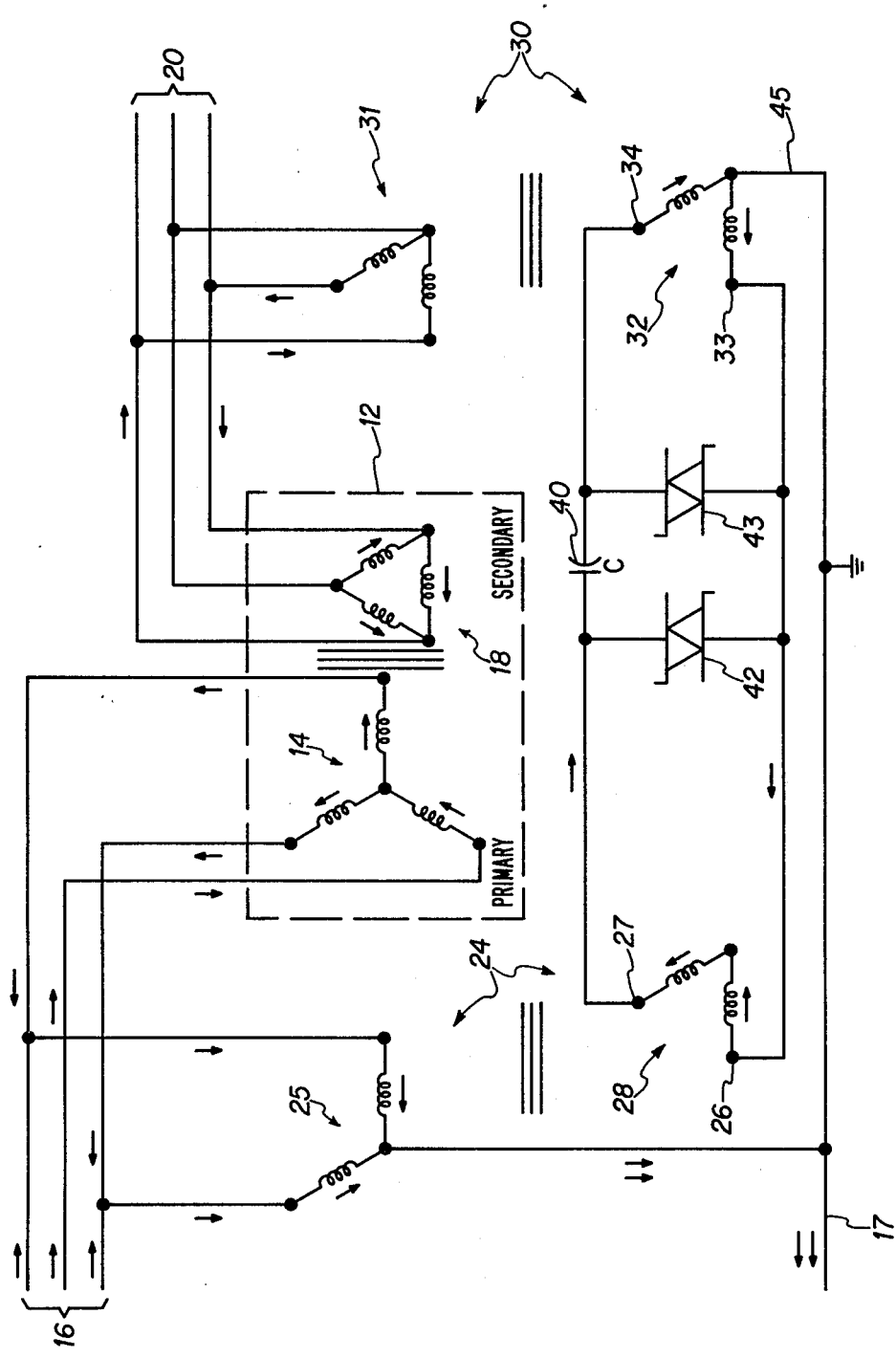
FIG. 1 is a schematic diagram of a coupling circuit in accordance with the invention, shown coupling between two three-phase power lines interconnected by a power transformer.

In FIG. 1, there is shown a circuit according to the invention for coupling a power line communication signal between three-phase power lines 16, with neutral 17 and three-phase power lines 20. The communication signal in lines 16 is to operate in a balanced phase-to-neutral mode. That is, the signal voltage with respect to neutral 17 is designed to be the same on each of the lines 16. In lines 20, the communication signal is to operate in an opposing phase-to-phase mode. The communication signal is designed to be the same magnitude but of opposite polarity between the center phase conductor and the two outer conductors. Thus the communications signal magnitude between the two outer conductors is approximately twice that of the other two conductor combinations. The signal is to be transmitted not only from lines 16 to 20, but also in the direction from lines 20 to 16. The bypass of the invention is intended to be particularly useful with communication signals having a carrier frequency $f_c$ in the range 3-10 KHz.

In the particular environment illustrated in FIG. 1, the power lines 16 and 20 are shown interconnected by a wye-to-delta power transformer 12. A first step-down coupling transformer 24 has the two open-wye primary windings 25 thereof each connected to a different one of the three-phase lines 16. The secondary 28 of transformer 24 is connected in open-delta fashion, thereby presenting two available terminals 26 and 27. The node of the open wye of transformer 24 is connected to the neutral 17 associated with the three-phase lines 16.

A second step-down transformer 30 has the two open-delta primary windings 31 thereof connected each to a different one of the three-phase lines 20. Again the secondary 32 of transformer 30 is connected in open-delta fashion presenting two available terminals 33 and 34.

Transformers 24 and 30 are referred to in this specification and claims simply as "transformers". Yet in actual practice, transformer 24 will generally be implemented as a bank of two individual transformers, and "transformer" 30 will also.

Terminals 26 and 33 of the two secondaries are connected together, while a capacitor 40 with capacitance C is connected between the other two available terminals 27 and 34 of the two secondaries. In the preferred embodiment, metal oxide varistor (MOV) 42 is connected across terminals 26 and 27, while MOV 43 is connected across terminals 33 and 34.

In the embodiment of FIG. 1, the common terminal between the windings of secondary 32 is connected to ground, as shown at connection 45. The loop formed by secondaries 32 and 28 and capacitor 40 can be grounded at any convenient point in the loop, but it is preferable to ground this loop at one point only to minimize stray coupling of signal or noise. The single ground connection does not participate in signal coupling but serves protective and safety purposes by insuring low power voltages with respect to ground around said loop.

The capacitance C is chosen so that the series circuit including capacitor 40 and secondaries 28 and 32 is resonant at the carrier frequency $f_c$ of the communication signal. The self inductance $L24$ and $L_{30}$ of each transformer, as seen by the remainder of the series resonant circuit, is defined to be that inductance measured at the frequency $f_c$ across the open-delta terminals of the windings, when the opposite windings of each transformer are shorted. When the two coupling transformer banks are not located in the same place, the series inductance $L_L$ of interconnecting lines can be appreciable. In this case, the resonance condition is given by:

$$(2\pi f_c)^2 = 1/(L_{24}+L_{30}+L_L)C.$$

For minimum coupling losses, $L_L$ should be minimized, and therefore the length and impedance of interconnecting lines must be minimized. This is manageable, if the interconnecting lines are constructed of triplex or a similar close-spaced conductor configuration well known in power utility practice. The interconnecting link between transformer banks can utilize the two insulated conductors of the triplex, while the bare messenger conductor may be employed for auxiliary grounding purposes.

The coupling transformer banks 24 and 30 can be composed of transformers selected from common utility stock of relatively inexpensive single-phase distribution transformers. For maximum transparency, that is, equal coupling efficiency in both directions of coupling, the primary voltage ratings of transformers 24 and 30 should match that of the respectively connected feeders 16 and 20, the KVA ratings must be equal, the percent impedances should be approximately equal and the secondary voltage ratings (around the series resonant loop) must be equal. A secondary voltage rating of 240 volts per phase is considered suitable. For this rating, a transformer power rating of 25 KVA per phase at two percent impedance or less in each bank provides a nearly optimum compromise among factors of cost, permissible interconnecting line length, and resonating capacitance.

The self inductance of the transformers provides sufficient isolation of transients between feeders, while the resonating capacitor 40 blocks circulating currents at the fundamental power frequency and the lower harmonics thereof. The fundamental power frequency voltage (and to a large extent that of the lower frequency harmonics) across the capacitor 40 is cancelled by vector addition of the normal voltages around the series resonant loop, except for residual imbalances. Therefore, the normal steady-state voltage stress on capacitor 40 is minimized to a few percent of the voltage (e.g. 240 volts per phase) in the transformer banks. Nevertheless, the voltage rating of capacitor 40 should be sufficient to withstand temporary or inadvertent loss of excitation or single-phasing conditions at either transformer 24 or 30 or both, with worstcase, vectorially-additive voltages.

The resonating capacitor 40 should be protected against transient impulses from either transformer 24 or 30. A single metal oxide varistor across the capacitor would accomplish this, but would then couple larger transients between transformers 24 and 30. One MOV across each open-delta circuit as shown satisfies both requirements. The conducting threshold of each MOV should be selected to tolerate the normal voltage present across its terminals, thus automatically satisfying single phasing conditions in this configuration. Alternative protection means are well known in the art.

FIG. 1 shows the coupling circuit of the invention bypassing a floating-wye/delta power transformer bank 12 serving a delta configured feeder from a wye-grounded configured feeder. Perhaps most often, the coupling circuit is located at the transformer 12, but this need not be so, if elsewhere there is access to both feeders at a reasonable distance.

Moreover, the power transformer 12 need not be of the floating-wye/delta configuration, although that configuration is ideal for the application of this coupling circuit. THe power transformer could be a delta/delta transformer, with the disadvantage, however, that the normal steady-state voltage across coupling capacitor 40 could not be minimized to the degree described above. This is due to the minimum 30° phase shift between coupling bank secondaries that would result at the power frequency.

It can be observed that the coupling circuit of FIG. 1 is not fully balanced among the phases of power line 16, because the circuit is connected to only two phases, for example, phases A and C. Some loss of coupling efficiency results from this arrangement over that of a configuration completely balanced among the wye phases, but not as much as might first appear due to the several following factors.

Over a significant length of open-wire feeder between the connection of this coupling circuit and the serving substation, the power line communication signals will couple between the combination of the A and C phase conductors and the phase B conductor. Such coupling will be most effective, if the phase B conductor is physically located between phases A and C over a maximum portion of that length.

Over a significant length of common-concentric-neutral cable between the connection of this coupling circuit and the substation, coupling between conductors is much greater than that for the open-wire configuration just described.

A capacitor bank between the connection of this coupling circuit and the substation will force signal coupling between the phase conductors. Such a capacitor bank can be wye-connected with floating, or suitably isolated neutral, or it can be delta-connected. Ideally for this purpose, such a capacitor bank is connected at or very near the point of connection of this coupling circuit to the wye feeder. This factor presumes that only balanced phase-to-neutral, wye-grounded signaling is intended on the wye feeder and that such a capacitor bank therefore is not isolated or trapped to allow phase-to-phase signaling.

In the arrangement of FIG. 1, some signal current from transformer 30 flows backwards into the secondary of power transformer 12. This does not appreciably affect the desired operation, because the series inductive reactance of transformer 12 is high to frequency $f_c$ and transformer 12 has no series resonating capacitance like that associated with the coupling transformers 24 and 30. Therefore, the signal coupling functions of transformers 24 and 30 and capacitor 40 overcome the loading effects of the power transformer on the desired communications signal, even when transformers 24 and 30 are physically much smaller in KVA rating than transformer 12.

As the size, that is, the KVA rating of transformer 12 increases relative to the size of transformers 24 and 30 in different applications of the present invention, the backward flow of signal current through the power transformer increases proportionately and thus may become appreciable. The arrows in FIG. 1 show that correct phasing of transformers 24 and 30 with transformer 12 causes resultant communications signal currents in the primary of transformer 12 in directions that aid flow in the coupling circuit. These currents also aid in maintaining the balance of communications signal current flow among the phase conductors of lines 16. This effect can never be fully restorative, due to normal losses through the total coupling path, but such flow as exists through transformer 12 aids rather than opposes balanced flow on lines 16. In a different case, when transformer 12 is a delta/delta bank, the backward flow of signal through the power transformer cannot be phased for improvement of signal current balancing among the conductors of lines 16.

As the backward flow of signal current through transformer 12 becomes appreciable, it will tend toward a lagging phase angle due to the nonresonated series inductive reactance of the power transformer self impedance. This effect diminishes the vectorial contribution of these currents towards signal balancing on the wye feeder lines 16. However, this effect can be compensated by trimming the capacitance C to cause a more nearly in-phase contribution.

Due to reciprocity of transfer impedance, phenomena that aid signal current flow in one direction (e.g., from substation via feeder to customer site) will contribute similarly when the direction of signal current is reversed.

Figure 2:
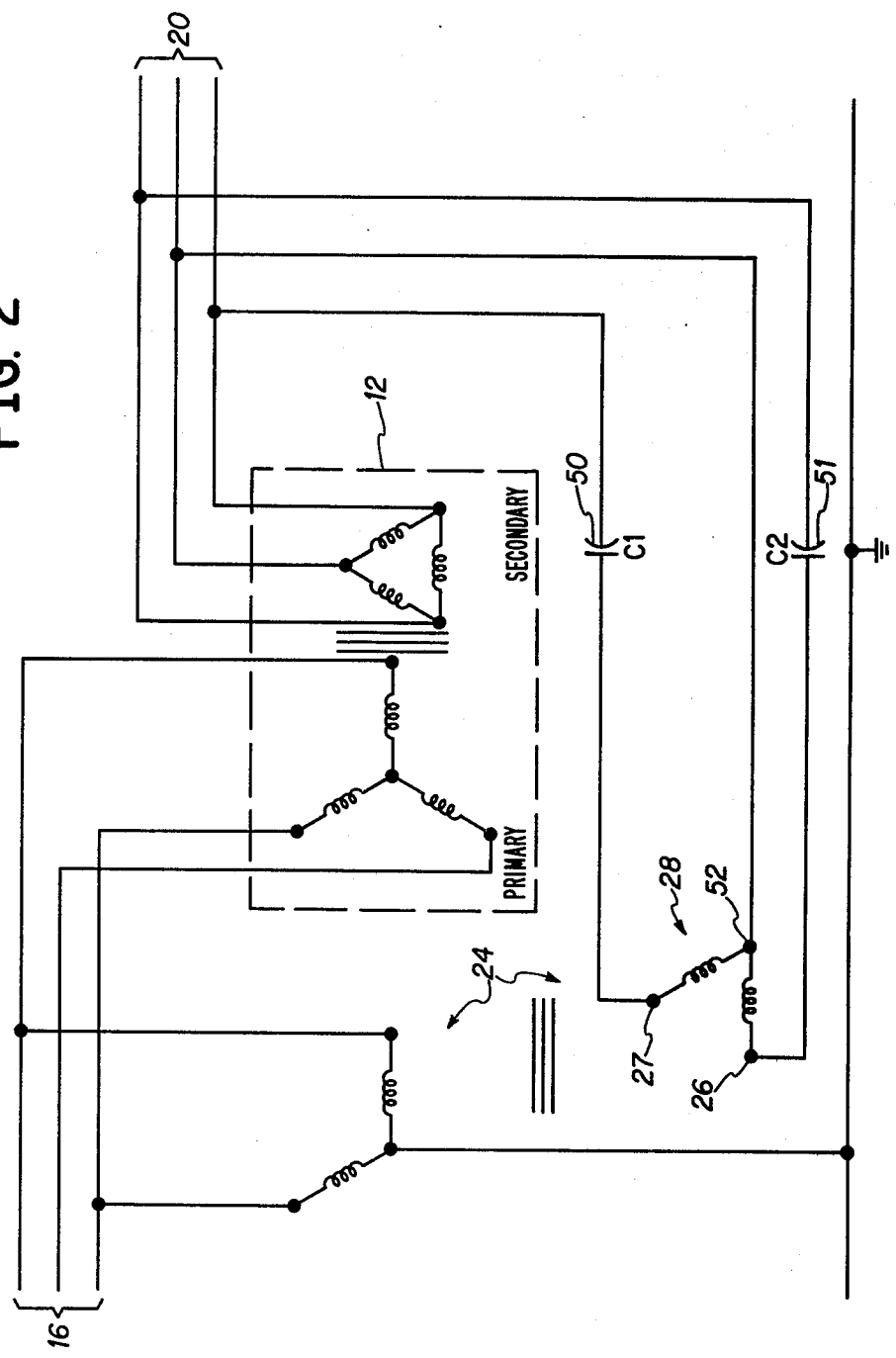
FIG. 2 is a schematic diagram of a second embodiment of a coupling circuit according to the invention, shown coupling two three-phase power lines interconnected with a power transformer.

FIG. 2 shows an embodiment of the coupling circuit of the invention, wherein one of the coupling transformers is eliminated. In the embodiment of FIG. 2, the available terminal 27 of secondary 28 is connected to one terminal of first capacitor 50, and available terminal 26 is connected to one terminal of second capacitor 51. Then the common node 52 of secondary 28, and the other terminals of the capacitors 50 and 51 are connected each to a different one of the three phase lines 20.

While the circuit of FIG. 2 does eliminate one transformer, the voltage ratings of the secondary windings of transformer 24 need to approximately match that of the delta feeder 20. This greatly increases the cost of the transformer 24 over the cost of standard distribution transformers commonly available in local utilities stock. Moreover, the low secondary voltage-rated capacitor 40 of the circuit of FIG. 1 would be replaced with two feeder voltage-rated capacitors 50 and 51, increasing the cost not only of the capacitors required, but also of suitable protection for them. Most of these disadvantages will abate, however, when the circuit of FIG. 2 is used as a signal bypass around a commercial/industrial distribution transformer 12, where the delta secondary is at a low customer utilization voltage, such as 240 volts.

Having considered the coupling circuit of the invention in detail, it is apparent that a number of advantages are provided. The circuit accomplishes the necessary signal propagation mode change, while providing isolation between two three-phase lines at the fundamental power frequency voltage. Conformance of voltage ratios between the communications signal and the power voltage provides bi-directional transparency to the transmitted signal. A series resonant secondary loop in the coupling circuit improves signal coupling efficiency between the power lines. The coupling circuit, fabricated with passive components, requires in a preferred embodiment a capacitor which need be rated only for the secondary voltage. Similarly, the circuit of the invention employs ordinary transformers, without the requirement of special ratings.

I claim:

1. A circuit for bi-directionally coupling a communications signal, having a carrier frequency, from first three-phase lines and neutral conductor to second three-phase lines, with the ratio of the power voltages on the first lines to the power voltages in the second lines being R, and wherein the communications signal is to be transmitted as a balanced phase-to-neutral signal on said first lines and as a phase-to-phase signal on said second lines, comprising:

first and second transformers, the first transformer having an open-wye primary and open-delta secondary, and the second transformer having open-delta primary and secondary, each secondary having an available terminal for each of its two windings, the primary of said first transformer having each of the two windings thereof connected to a different one of said first three-phase lines and the primary of said second transformer having each terminal thereof connected to a different one of said second three-phase lines and having the node of the open wye primary connected to said neutral conductor, a first one of said available terminals of said first transformer secondary being connected to a first one of the available terminals in the second transformer secondary, and a capacitor with capacitance C connected between a second one of the available terminals of the first transformer secondary and a second one of the available terminals of the second transformer secondary.

2. The circuit of claim 1, wherein the primary-to-secondary voltage ratios of said transformers are selected to establish a signal voltage transformation ratio from said first three-phase lines to said second three-phase lines which is approximately equal to R.

3. The circuit of claim 1, wherein the series combination including the capacitance C and the self inductances of the transformers is substantially resonant at said carrier frequency.

4. The circuit of claim 3, wherein said series resonant combination includes interconnecting lines having significant series induc- tance.

5. The circuit of claim 1, further including means for diverting extraordinary current from said transformer secondaries and from said capacitor.

6. The circuit of claim 5, wherein said means for diverting includes means for limiting the voltage across said available terminals of the first transformer secondary by the absorption of energy of extraordinary current, and includes a like means for limiting the voltage across the available terminals of the second transformer secondary.

7. The circuit of claim 6, wherein each of said means for limiting voltage includes a metal oxide varistor.

8. The circuit of claim 1, wherein a point in the loop formed by said transformer secondaries and said capacitor is connected, at least indirectly, to ground.

9. A circuit for bi-directionally coupling a communications signal, having a carrier frequency, from first three-phase lines and neutral conductor to second three-phase lines, with the ratio of the power voltages on the first lines to the power voltages in the second lines being R, and wherein the communications signal is to be transmitted as a balanced phase-to-neutral signal on said first lines and as a phase-to-phase signal on said second lines, comprising:

a transformer having an open wye primary and an open delta secondary with one terminal common to the two secondary windings thereof and two available terminals, said primary having each of the two windings thereof connected to a different one of said first three phase lines and the node of the open wye connected to said neutral conductor, and first and second capacitors, each having one terminal thereof connected to a different one of said available terminals of said secondary, and the other terminals of the capacitors connected, along with the common terminal of said secondary, each to a different one of said second three-phase lines.

10. A circuit for bi-directionally coupling a communications signal, having a carrier frequency, from first three-phase lines and neutral conductor to second three-phase lines, with the ratio of the power voltages on the first lines to the power voltages in the second lines being R, and wherein the communications signal is to be transmitted as a balanced phase-to-neutral signal on said first lines and as a phase-to-phase signal on said second lines, comprising:

a transformer having an open wye primary and an open delta secondary with one terminal common to the two secondary windings thereof and two available terminals, said primary having each of the two windings thereof connected to a different one of said first three phase lines and the node of the open wye connected to said neutral conductor, a capacitor having first and second terminals, the first terminal thereof being connected to one of said available terminals of said secondary, and means, connected to each of said second three-phase lines and to said second capacitor terminal and to the other of said available terminals of said secondary, for coupling said signal between said second lines and said secondary.

* * * * *